(12) United States Patent
Yamamoto et al.

(10) Patent No.: US 8,260,095 B2
(45) Date of Patent: Sep. 4, 2012

(54) OPTICAL DEVICE, OPTICAL SYSTEM, AND METHOD OF MANUFACTURING OPTICAL DEVICE

(75) Inventors: Rei Yamamoto, Tsukuba (JP); Toshihiro Kuroda, Tsukuba (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 630 days.

(21) Appl. No.: 12/440,332

(22) PCT Filed: Sep. 7, 2007

(86) PCT No.: PCT/JP2007/067502
§ 371 (c)(1),
(2), (4) Date: Mar. 6, 2009

(87) PCT Pub. No.: WO2008/029914
PCT Pub. Date: Mar. 13, 2008

(65) Prior Publication Data
US 2010/0172608 A1    Jul. 8, 2010

(30) Foreign Application Priority Data

Sep. 8, 2006 (JP) ................................. 2006-244633
Sep. 8, 2006 (JP) ................................. 2006-244634

(51) Int. Cl.
*G02B 6/12* (2006.01)
(52) U.S. Cl. ................. 385/14; 216/24; 385/49; 385/83
(58) Field of Classification Search ............... 385/14, 385/31, 38, 129–132, 65, 83; 216/24
See application file for complete search history.

(56) References Cited

U.S. PATENT DOCUMENTS

| 5,239,601 | A | 8/1993 | Denis et al. |
| 6,550,981 | B1 | 4/2003 | Yamauchi |
| 8,002,477 | B2 * | 8/2011 | Colgan et al. ............ 385/89 |
| 2005/0001282 | A1 | 1/2005 | Steinberg |

FOREIGN PATENT DOCUMENTS

| EP | 1 479 648 A2 | 11/2004 |
| GB | 2 356 066 A | 5/2001 |
| JP | 04-507153 | 12/1992 |
| JP | 08-075950 | 3/1996 |
| JP | 09-159866 | 6/1997 |
| JP | 2771167 | 4/1998 |
| JP | 10-199856 | 7/1998 |
| JP | 11-014860 | 1/1999 |
| JP | 2949282 | 7/1999 |

(Continued)

*Primary Examiner* — Ellen Kim
(74) *Attorney, Agent, or Firm* — Antonelli, Terry, Stout & Kraus, LLP.

(57) ABSTRACT

An optical device to be connected to an optical fiber and an optical system in which the optical fiber is fixed to the optical device are provided, which optical device and optical system can restrict variations in a distance between inclined surfaces for supporting the optical fiber, and can enhance a productivity of the optical device and system. The optical system according to the present invention is, for example an optical multiplexer/demultiplexer having an optical device according to the present invention, which device has a substrate (2) with a crystal axis, and a groove (10*a*) for supporting an optical fiber (6*a*). The groove (10*a*) has a pair of opposing inclined surfaces (24) for supporting the optical fiber (6*a*), and a recess (26) formed between the pair of opposing inclined surfaces (24).

11 Claims, 9 Drawing Sheets

FOREIGN PATENT DOCUMENTS

| | | |
|---|---|---|
| JP | 11-211933 | 8/1999 |
| JP | 3014035 | 12/1999 |
| JP | 2001-074982 | 3/2001 |
| JP | 2001-074985 | 3/2001 |
| JP | 2005-010766 | 1/2005 |
| JP | 2006-013142 | 1/2006 |
| WO | WO 91/13378 | 9/1991 |

* cited by examiner

OPTICAL DEVICE, OPTICAL SYSTEM, AND METHOD OF MANUFACTURING OPTICAL DEVICE

FIELD OF THE INVENTION

The present invention relates to an optical device, and more particularly to an optical device to which an optical fiber is to be connected.

Further, the present invention relates to an optical system in which an optical fiber is fixed to an optical device.

Further, the present invention relates to a method of manufacturing an optical device, and more particularly to a method of manufacturing an optical device to which an optical fiber is to be connected.

BACKGROUND OF THE INVENTION

It has been known in a large number of optical devices to form a groove for supporting an optical fiber, the groove having a V-shaped or inverted-trapezoidal-shaped cross section, by forming a predetermined mask film on a single crystal silicon substrate (a wafer) and then anisotropic etching the substrate (for example, see Patent Publications 1-3 listed later). The V-shape or inverted trapezoidal shape of the cross section is caused by differences in etching rates due to different crystal orientations. Generally, the anisotropic etching is performed by forming the mask film made from $SiO_2$ on a silicon single crystal substrate, and then by wet etching with an etching solution such as a potassium hydroxide, etc.

FIG. 5 is a cross-sectional view of a silicon substrate showing progress of an etching process when a groove having a V-shaped cross section or an inverted trapezoidal cross section is formed, and FIG. 6 is a graph showing the relationship between a wet-etching time and a depth of the groove. As shown in FIG. 5, when a mask film 52 on a silicon substrate 50 is formed with an aperture 52a having a width WM, an etching process progresses in the order (a), (b), (c) in FIG. 5. During the progress of the etching process, a change in a width WV of the groove 54 (i.e., a distance between upper edges of inclined surfaces 54a) is small, while a depth DV of the groove 54 becomes large. FIG. 5(a) shows a state SA in which the inclined surfaces 54a of the groove 54 are formed to a location PA at which the optical fiber F contacts the groove 54 when the former is supported on the latter. FIG. 5(b) shows a state SB in which the inclined surfaces 54a of the groove 54 are formed to a location PB and thus the optical fiber F can be supported on the groove 54. FIG. 5(c) shows a state SC in which the inclined surfaces 54a of the groove 54 are formed until a shape of a cross section of the groove 54 becomes a V-shape. Further, as shown in FIG. 6, the depth of the groove 54 is in proportion to the wet-etching time. The times TA, TB, TC shown in FIG. 6 are respective times corresponding to the states SA, SB, SC.

FIG. 7 is a view showing the relationship between the width WM of the aperture and the width of the groove (i.e., the distance between the upper edges of the inclined surfaces) WV when there is an angle between a direction in which an edge of the aperture 52a of the mask film 52 extends and a predetermined crystal orientation of the substrate 2 (hereinafter, said angle is referred to as "an orientation misalignment"). When there is such an orientation misalignment, as shown in FIGS. 7(a) and 7(b), the width WV of the groove is larger than the width WM of the aperture. FIG. 7(a) shows a state in which the orientation misalignment is relatively small, while FIG. 7(b) shows a state in which the orientation misalignment is relatively large. As can be seen from FIGS. 7(a) and 7(b), the larger the orientation misalignment is, the larger a side-etched amount is, the side-etched amount being a difference δ between the width WV of the groove and the width WM of the aperture.

FIG. 8 is a view showing the relationship between the etching time and the variation in the width of the groove when there is an angle or an orientation misalignment between a direction in which the edge of the aperture 52a of the mask film 52 extends and the predetermined crystal orientation of the substrate 2. The times TA, TB, TC shown in FIG. 8 are respective times corresponding to the states SA, SB, SC shown in FIG. 5. As can be seen from FIG. 8, when the etching time becomes longer than a certain time TD, the variation in the width WV of the groove gradually becomes large. Further, the larger the orientation misalignment is, the larger the variation in the width WV of the groove is. Preferably, a standard deviation of the variation in the width WV of the groove is equal to or less than 0.18 µm.

Therefore, in order to reduce such variations in the width WV of the groove, it is preferable that the etching time be set so as to be less than the time TD shown in FIG. 8. However, when the etching time is set so as to be less than the time TD, a problem that the optical fiber F and the substrate 2 interfere with each other is caused as shown in FIG. 5(a), Regarding this problem, the Patent Publication 4 listed later presents two solutions. FIG. 9 is a cross-sectional view of a prior art groove showing a first solution, and FIG. 10 is a cross-sectional view of a prior art groove showing a second solution.

As shown in FIG. 9, in the first solution, an etching process for forming the inclined surfaces 54a is finished between the state SA and the state SB shown in FIG. 5, a piece of the optical device is subsequently cut away from the wafer, and the through-bore 56 is individually made by means of a dicing process.

As shown in FIG. 10, in the second solution, an etching process for forming the inclined surfaces 54a is finished between the state SA and the state SB shown in FIG. 5, a wafer is inverted upside down, and the wafer is etched from a surface 50b opposite to the surface 50a on which inclined surfaces 54a are formed in order to form a through-bore 58 for removing a portion of the substrate 50 which portion interferes with the optical fiber F.

Patent Publication 1: Japanese Patent Laid-open Publication No. 10-199856

Patent Publication 2: Japanese Patent Publication No. 2771167

Patent Publication 3: Japanese Patent Publication No. 2949282

Patent Publication 4: Japanese Patent Publication No. 3014035

SUMMARY OF THE INVENTION

In the above first solution, since the through-bore 56 is made by means of a dicing process after a piece of the wafer is cut away from the wafer, it is not suitable for mass production, and thus productivity decreases. Further, in the above second solution, since an alignment procedure of the wafer is required to be done again after the wafer is inverted upside down, productivity decreases. Further, in both of these solutions, since the through-bores 56, 58 are made, the level of viscosity of an adhesive for fixing the optical fiber to the inclined surfaces 54a is required to be relatively high so that the adhesive does not drop from the through-bores 56, 58. This also decreases productivity.

Accordingly, it is an object of the present invention to provide an optical device to be connected to an optical fiber, an optical system in which an optical fiber is fixed to the optical device, and a method of manufacturing an optical device to be connected to an optical fiber, the variation in the distance between the inclined surfaces for supporting the optical fiber being allowed to be restricted and thus productivity being enhanced.

Means for Solving the Problems

In order to achieve the aforementioned objects, an optical device according to the present invention is an optical device to be connected to an optical fiber comprising a substrate having a crystal axis; and a groove formed in the substrate for supporting an optical fiber, wherein the groove has a pair of opposing inclined surfaces for supporting the optical fiber, and a recess formed between the pair of opposing inclined surfaces.

In an embodiment of the optical device according to the present invention, the groove may be constituted of the pair of opposing inclined surfaces for supporting the optical fiber, and the recess formed between the pair of opposing inclined surfaces.

Also, in an embodiment of the optical device according to the present invention, preferably the recess has a pair of opposing side surfaces and a bottom surface.

In this embodiment of the optical device according to the present invention, preferably the optical fiber does not contact the bottom surface of the recess when the optical fiber is supported on the groove.

Also, in an embodiment of the optical device according to the present invention, preferably the pair of opposing inclined surfaces is formed by using an anisotropic etching process.

Also, in an embodiment of the optical device according to the present invention, preferably, the recess is formed by using a dry etching process.

Also, in an embodiment of the optical device according to the present invention, preferably, the substrate is a silicon substrate.

In the optical device according to the present invention, although the substrate is anisotropic etched to form a portion of the inclined surfaces for supporting the optical fiber, such an anisotropic etching process is finished in such a state that the optical fiber interferes with the substrate. In this state, the variation in the distance between the inclined surfaces for supporting the optical fiber can be restricted. Further, the recess located between the inclined surfaces allows interference between the optical fiber supported on the inclined surfaces and the substrate to be prevented, or at least allows the optical fiber to be contact the recess. Also, the inclined surfaces and the recess are formed without inverting a wafer upside down. Additionally, in the optical device according to the present invention, in order to fix the optical fiber to the substrate, an adhesive can be selected regardless of the level of viscosity of the adhesive. Therefore, even if an adhesive having a relatively low level of viscosity is selected, the adhesive can be merely filled into the recess, because the adhesive does not drop unlike a prior art optical device having a through-bore. As a result, the variation in the distance between the inclined surfaces for supporting the optical fiber can be restricted, and thus productivity can be enhanced.

Also, in order to achieve the aforementioned objects, the optical system according to the present invention comprises the optical device according to the present invention described before; and an optical fiber supported on and fixed to the inclined surfaces of the optical device.

In order to achieve the aforementioned objects, a method of manufacturing an optical device connected to an optical fiber according to the present invention comprises a step of forming a groove for supporting an optical fiber, wherein the groove forming step includes a first step of forming a pair of opposing inclined surfaces on a substrate having a crystal axis by using an anisotropic etching process; and a second step of forming a recess by a dry etching process, the recess being located between the pair of opposing inclined surfaces which are formed in the first step.

In the method of manufacturing the optical device connected to the optical fiber, although the substrate is anisotropic etched to form a portion of the inclined surfaces for supporting the optical fiber, such an anisotropic etching process is finished in such a state that the optical fiber interferes with the substrate. In this state, the variation in the distance between the inclined surfaces for supporting the optical fiber can be restricted. Further, the recess is formed between the inclined surfaces by means of a dry etching process. This allows interference between the optical fiber supported on the inclined surfaces and the substrate to be prevented. Also, the inclined surfaces and the recess are formed without inverting a wafer upside down. Additionally, in the optical device manufactured by the method according to the present invention, in order to fix the optical fiber to the substrate, an adhesive can be selected regardless of the level of viscosity of the adhesive. Therefore, an adhesive having a relatively low level of viscosity can be filled into the recess, because the adhesive does not drop unlike in a prior art optical device having a through-bore. As a result, the variation in the distance between the inclined surfaces for supporting the optical fiber can be restricted, and thus productivity can be enhanced.

In an embodiment of the method according to the present invention, preferably the first step is finished before a state in which the optical fiber can be supported on the pair of opposing inclined surfaces is achieved. More preferably, the second step is performed at least until a state in which the optical fiber can be supported on the pair of opposing inclined surfaces is achieved.

Also, in an embodiment of the method according to the present invention, preferably, the groove forming step further includes a third step of forming a recess-forming mask film between the first step and the second step, wherein the third step includes steps of forming an oxidized film on the substrate formed with the inclined surfaces in the first step; and removing a portion of the oxidized film by using a negative resist, at which portion the recess is to be formed.

In this manufacturing method, the recess-forming mask film for the dry etching process can be easily formed.

Also, in an embodiment of the method according to the present invention, preferably the groove forming step further includes a third step of forming a recess-forming mask film between the first step and the second step, wherein the third step includes steps of forming an oxidized film on the substrate formed with the inclined surfaces in the first step; applying a negative resist onto the oxidized film; removing a portion of the negative resist corresponding to the recess via a negative-resist mask; removing a portion of the oxidized film corresponding to the recess by using the remaining portion of the negative resist as a mask; and removing the negative resist so that the remaining portion of the oxidized film becomes the recess-forming mask film.

In this manufacturing method, the recess-forming mask film for the dry etching process can be easily formed.

In an embodiment of this manufacturing method, preferably the groove forming step further includes a step of removing the remaining portion of the oxidized film after the second step.

In this manufacturing method, adhering matters removed from the substrate and then adhering to the oxidized film in the dry etching process can be removed along with the remaining portion of the oxidized film.

In an embodiment of the manufacturing method including the step of removing the remaining portion of the oxidized film, preferably, the groove forming step further includes a step of forming a new oxidized film after the step of removing the remaining portion of the oxidized film.

In this manufacturing method, after the oxidized film is removed from the substrate, the substrate can be protected.

In an embodiment of the manufacturing method including the step of removing the portion of the negative resist corresponding to the recess, preferably the method includes a step of further removing a portion of the negative resist corresponding to a pilot marker via the negative-resist mask.

In this manufacturing method, a process control can be easily performed.

Therefore, the optical device, the optical system, and the method of manufacturing the optical device connected to the optical fiber according to the present invention allows the variation in the distance between the inclined surfaces for supporting the optical fiber to be restricted, and thus productivity can be enhanced.

DETAILED DESCRIPTION OF THE PREFERRED EMBODIMENTS

Figure 1:
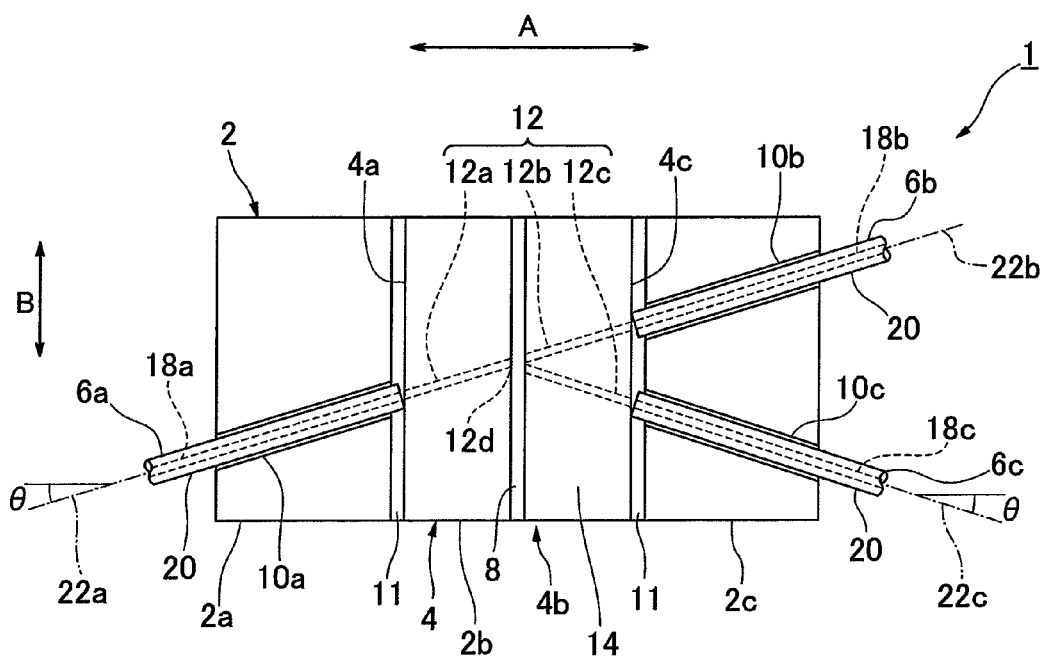
FIG. 1 is a plan view of an optical multiplexer/demultiplexer which is an embodiment of the present invention.

Now, referring to the drawings, an embodiment of the optical device and the optical system according to the present invention will be explained.

Firstly, an optical multiplexer/demultiplexer, which is an embodiment of the optical system according to the present invention, will be explained with reference to FIGS. 1 and 2. FIG. 1 is a plan view of an optical multiplexer/demultiplexer which is an embodiment of the optical system according to the present invention, and FIG. 2 is a front view of the optical multiplexer/demultiplexer shown in FIG. 1.

Figure 2:
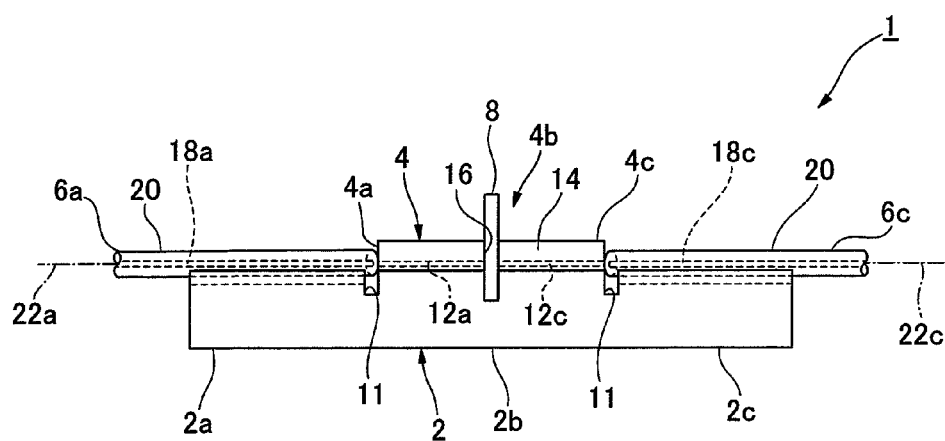
FIG. 2 is a front view of the optical multiplexer/demultiplexer shown in FIG. 1.

As shown in FIGS. 1 and 2, the optical multiplexer/demultiplexer 1, which is the embodiment of the optical system according to the present invention, has a substrate 2 which is an embodiment of the optical device according to the present invention, an optical waveguide 4 which is an optical element mounted on the substrate 2, three optical fibers 6a, 6b, 6c connected to the optical waveguide 4, and an optical filter 8 disposed at an intermediate section 4b of the optical waveguide 4. Concretely, the optical waveguide 4 is layered on the substrate 2. The substrate 2 and the optical waveguide 4 define an embodiment of the optical device according to the present invention.

The substrate 2 extends in a light propagation direction A, the optical waveguide 4 is layered on the intermediate part 2b of the substrate 2, and grooves 10a, 10b, 10c for respectively supporting the optical fibers 6a, 6b, 6c are formed on side sections 2a, 2c of the substrate 2, which side sections are located on opposite sides of the intermediate section 2b. Further, the substrate 2 also extends in a width direction B perpendicular to the light propagation direction A. Grooves 11 extending in the width direction B are respectively formed between the intermediate section 2b and the side sections 2a, 2c of the substrate 2. The substrate 2 is made of a material having a crystal axis, for example, an inorganic material such as silicone so that the material can be anisotropically etched. In the optical multiplexer/demultiplexer 1, a predetermined crystal orientation of the substrate 2 and the light propagation direction A are conformed to each other.

The optical waveguide 4 has a core 12 and a cladding 14, and the core 12 includes a plurality of core portions 12a, 12b, 12c, which core portions obliquely intersect relative to each other at an intersection 12d. Concretely, the optical multiplexer/demultiplexer 1 is provided with a first core portion 12a extending straight from one end surface 4a of the optical waveguide 4 to an intermediate part 4b thereof and extending obliquely at an intersecting angle θ relative to the light propagation direction A, a second core portion 12b extending straight from the intermediate part 4b to the other end surface 4c of the optical waveguide 4 and being optically aligned with the first core portion 12a, and a third core portion 12c extending straight from the intermediate part 4b to the other end surface 4c and extending obliquely at the intersecting angle θ relative to the light propagation direction A so that it intersects obliquely with the first core portion 12a and the second core portion 12b.

In the substrate 2 and the optical waveguide 4, the optical filter mounting groove 16 is formed, which is an optical filter mounting means for mounting the optical filter 8 extending across the intermediate part 4*b* of the optical waveguide 4, and to which the optical filter 8 is fixed with an adhesive. The optical filter 8 is, for example, a dielectric multilayer film filter, through which lights having the first wavelength λ1 (for example, 1310 nm) and the second wavelength λ2 (for example, 1490 nm) are transmitted and at which a light having the third wavelength λ3 (for example 1550 nm) is reflected.

The optical fibers 6*a*, 6*b*, 6*c* are single mode optical fibers, each of which has cores 18*a*, 18*b*, 18*c* optically connected to the respective core portions 12*a*, 12*b*, 12*c* of the optical waveguide 4, cladding 20, and respective optical axes or center lines 22*a*, 22*b*, 22*c*. In the optical multiplexer/demultiplexer 1, the optical axis 22*a* and the optical axis 22*b* are conformed to each other. An outer diameter of each of the optical fibers 6*a*, 6*b*, 6*c* is typically 125 μm.

There is an angle or an orientation misalignment θ between a direction in which the groove 10*a* for supporting the optical fiber 6*a* extends and the predetermined crystal orientation. A location and a width of the groove 10*a* are determined so that the optical axis 22*a* of the optical fiber 6*a* mounted on the groove 10*a* is aligned with the center line of the first core portion 12*a* of the optical waveguide 4 and an extended line thereof with a sub-micrometer precision.

Figure 3:
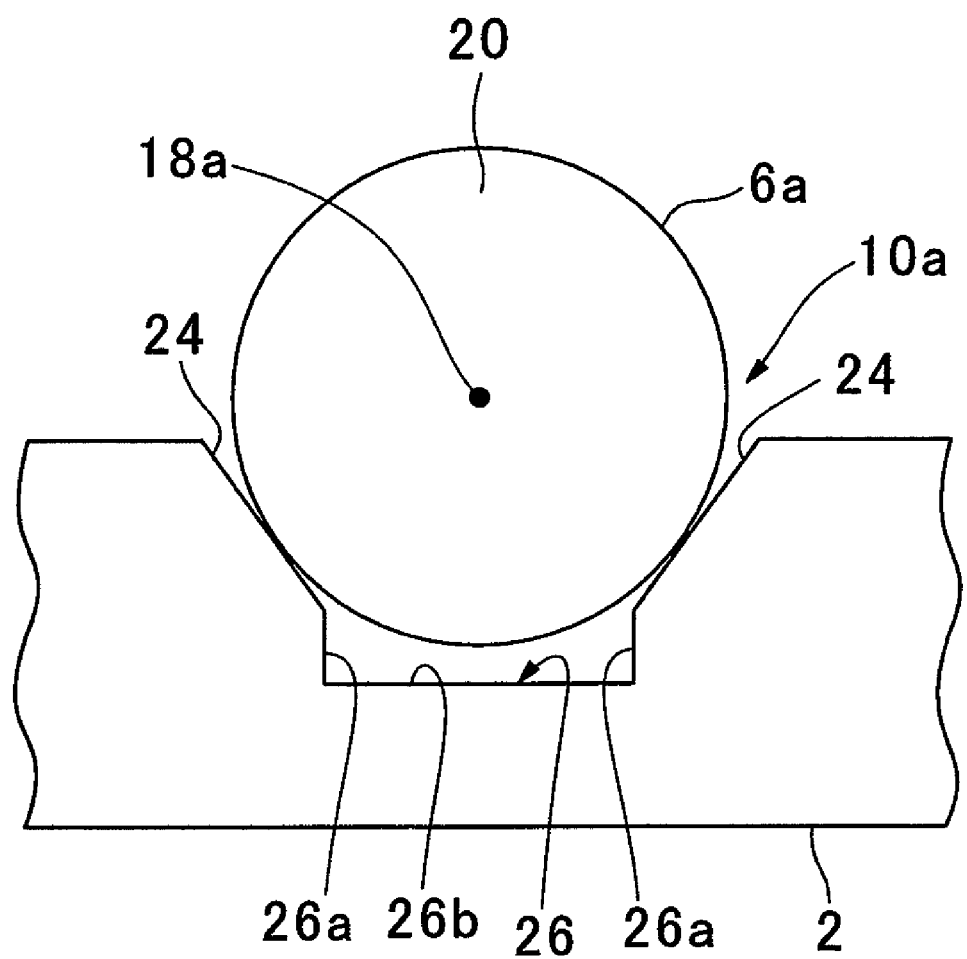
FIG. 3 is a cross-sectional view of a groove for supporting an optical fiber.

FIG. 3 is a cross-sectional view of the groove for supporting the optical fiber. As shown in FIG. 3, the groove 10*a* has a pair of opposing inclined surfaces 24 for supporting the optical fiber 6*a*, which surfaces are formed on the substrate 2 by using an anisotropic etching process, and a recess 26 formed between the opposing inclined surfaces 24 so as to be spaced from the optical fiber 6*a* supported on the opposing inclined surfaces 24. Concretely, the recess 26 has a pair of opposing side surfaces 26*a* and a bottom surface 26*b*.

Since the grooves 10*b*, 10*c* for respectively supporting the optical fibers 6*b*, 6*c* have respective structures similar to that of the groove 10*a*, an explanation of the structures of the grooves 10*b*, 10*c* is omitted.

When a light having the second wavelength λ2 is input into the optical fiber 6*b*, the light is propagated through the optical filter 8 to the optical fiber 6*a*. When a light having the first wavelength is input into the optical fiber 6*a*, the light is propagated through the optical filter 8 to the optical fiber 6*b*. Further, when a light having the third wavelength λ3 is input into the optical fiber 6*b*, the light is reflected at the optical filter 8 and propagated to the optical fiber 6*c*.

Next, referring to FIGS. 4A-4J, an example of a method of forming the grooves 10*a*, 10*b*, 10*c* for supporting the optical fibers, i.e., forming the inclined surfaces 24 and the recess 26, will be explained. FIGS. 4A-4J are illustrative views of steps of forming the inclined surfaces for supporting the optical fiber, and the recess.

Figure 4A:
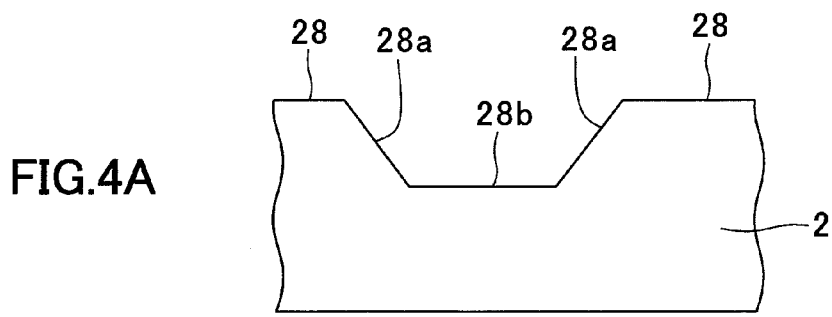
FIG. 4A is an illustrative view of a step of forming the groove for supporting the optical fiber.
Figure 8:
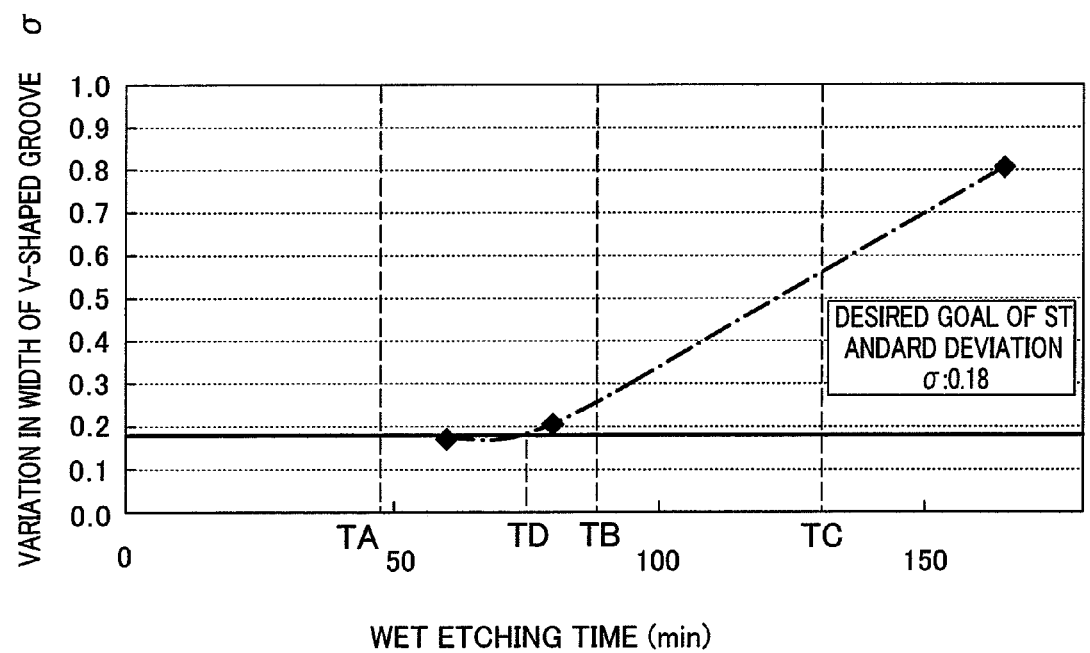
FIG. 8 is a view showing the relationship between an etching time and variation in the width of the groove when there is an orientation misalignment.
Figure 9:
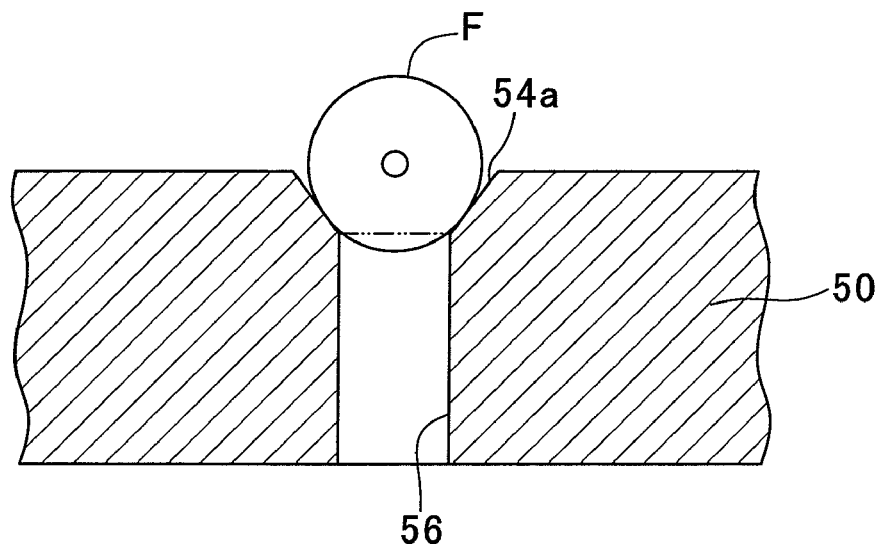
FIG. 9 is a cross-sectional view of a prior art groove.
Figure 10:
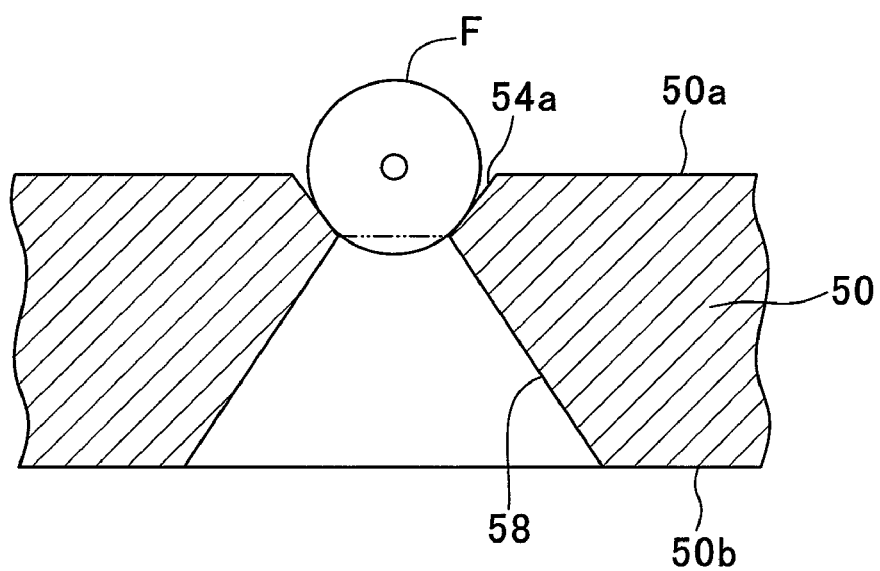
FIG. 10 is a cross-sectional view of a prior art groove.

Firstly, as shown in FIG. 4A, a pair of inclined surfaces 28*a* and a progressing surface 28*b* located between the inclined surfaces 28*a* are formed on an upper surface 28 of the substrate 2 made of an inorganic material and so on such as silicon by means of an anisotropic etching process for a predetermined time in accordance with an inclined-surface-forming resist pattern (not shown) made by means of a photolithography process, and then the inclined-surface-forming resist pattern (not shown) is removed. The anisotropic etching process is performed, for example, by means of a wet etching process using a KOH solution. The predetermined time is a time between the times TA and TB shown in FIG. 8, and preferably a time between the times TA and TD. For example, the predetermined time is 60-75 minutes.

Figure 4B:
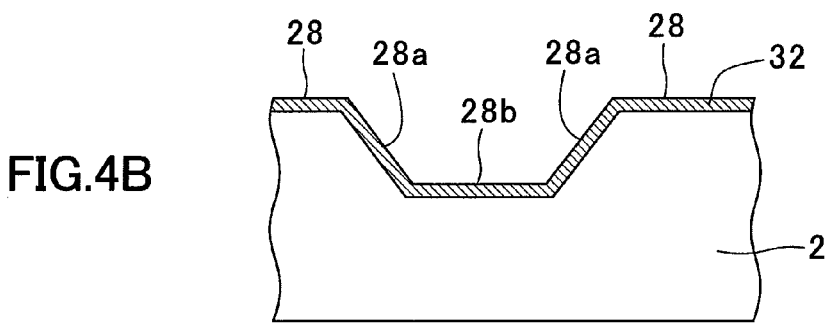
FIG. 4B is an illustrative view of a step of forming the groove for supporting the optical fiber.

Then, as shown in FIGS. 4B-4G, a recess-forming mask film is formed. Specifically, as shown in FIG. 4B, an oxidized film (SiO2) 32 is formed along the upper surface 28, the inclined surfaces 28*a* and the progressing surface 28*b* of the substrate 2. Preferably, the oxidized film 32 is a thermally oxidized film by means of a heating process in existing oxygen.

Figure 4C:
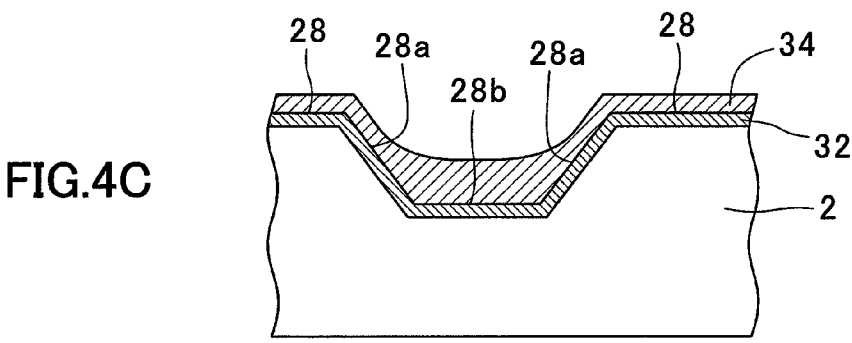
FIG. 4C is an illustrative view of a step of forming the groove for supporting the optical fiber.

Then, as shown in FIG. 4C, a step of applying a negative resist 34 onto the thermally oxidized film 32 by means of a spin coating process is performed. Preferably, the negative resist 34 is a chemical-amplification-type negative resist and it is available, for example, as ZPN1150 (25 mPa·s) manufactured by Nippon Zeon Co., Ltd. For example, a thickness of the negative resist 34 applied onto the upper surface 28 of the substrate 2 is 8 μm.

Figure 4D:
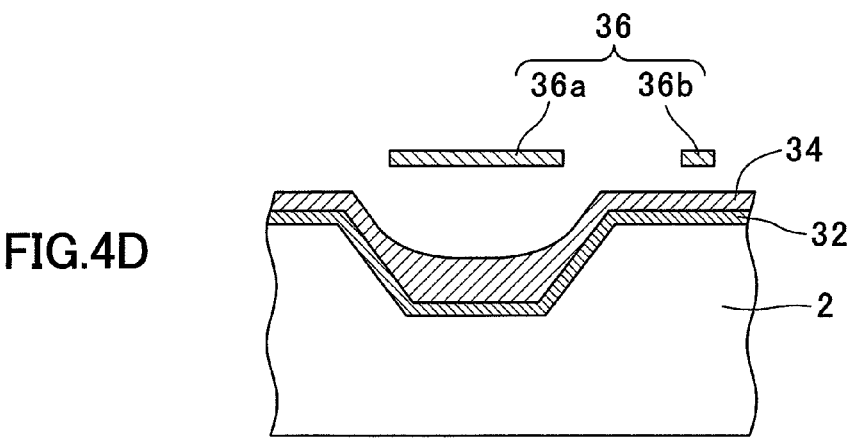
FIG. 4D is an illustrative view of a step of forming the groove for supporting the optical fiber.
Figure 4E:
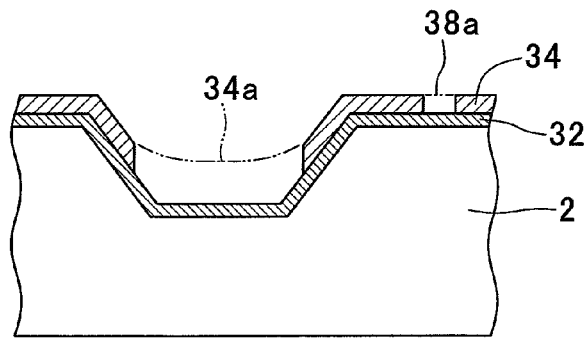
FIG. 4E is an illustrative view of a step of forming the groove for supporting the optical fiber.

Then, as shown in FIGS. 4D and 4E, a step of removing a portion 34*a* of the negative resist corresponding to the recess 26 is performed via a negative-resist mask 36. Concretely, the substrate 2 is moved beneath the negative-resist glass substrate mask 36, exposed by using a mercury lamp and so on (see FIG. 4D), and then developed (see FIG. 4E). The negative-resist mask 36 is placed at a location 36*a* corresponding to the recess 26 to be formed later. Preferably, the negative-resist mask 36 is placed at a location 36*b* corresponding to a pilot marker 38 (see FIG. 4F) to be provided on the upper surface 28 of the substrate 2 for process control. In this case, the negative resist 34 allows a portion 38*a* corresponding to the pilot marker 38 to be removed in addition to the portion corresponding to the recess 26.

In steps shown in FIGS. 4C-4E, using the negative resist 34 is preferable rather than using a positive resist. Specifically, in order to remove the resist potions 34*a*, 38*a* respectively corresponding to the recess 26 and the pilot marker 38, the exposing and developing processes may be performed once when the negative resist is used, while said processes are required to be repeated three or four times when the positive resist is used.

Figure 4F:
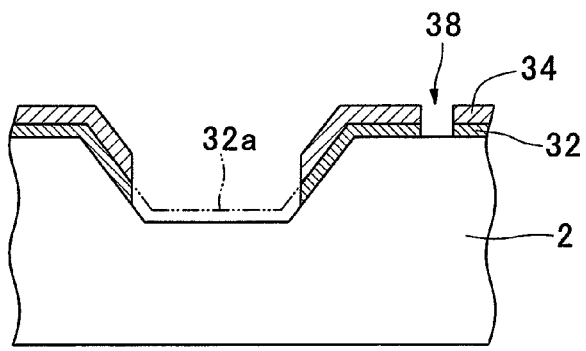
FIG. 4F is an illustrative view of a step of forming the groove for supporting the optical fiber.

Then, as shown in FIG. 4F, a step of removing a portion of the oxidized film 32 corresponding to the recess 26 is performed by using the remaining portion of the negative resist 34 as a mask. Concretely, a wet etching process is performed by using a buffered hydrofluoric acid (BHF). The BHF is a mixed aqueous solution (mixed acid) containing 0.5-30% of ammonium hydrogen difluoride and 10-40% of ammonium fluoride.

Further, in this step, the pilot marker 38 is formed on the upper surface 28 of the substrate 2. By measuring a depth of this pilot marker 38, whether or not the portion 32*a* of the oxidized film 32 corresponding to the recess 26 has been completely removed can be confirmed. In this step, if the oxidized film 32*a* to be removed remains, a dry etching process described later could not be performed.

Figure 4G:
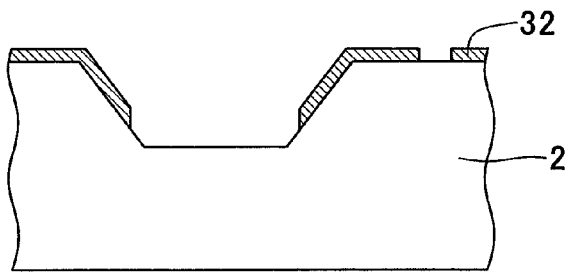
FIG. 4G is an illustrative view of a step of forming the groove for supporting the optical fiber.

Then, as shown in FIG. 4G, a step of removing the negative resist 34 is performed. For example, an ultrasonic immersion process is performed by using an acetone solution. The oxidized film 32 remaining on the substrate 2 serves as the recess-forming mask.

Figure 4H:
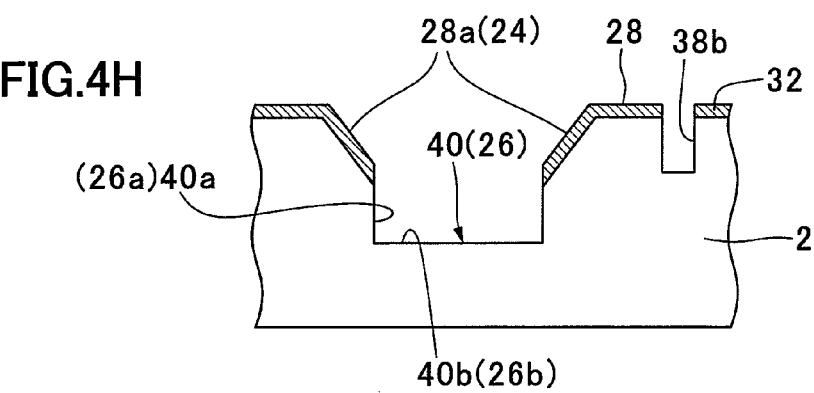
FIG. 4H is an illustrative view of a step of forming the groove for supporting the optical fiber.

Then, as shown in FIG. 4H, a step of forming a recess 40 located between the pair of opposing inclined surfaces by means of a dry etching process via the recess-forming mask film 32 is performed. Concretely, the recess 40 is constituted of a pair of side surfaces 40*a* and a bottom surface 40*b*. The dry etching process may be an ICP (Inductively Coupled Plasma) dry process or a RIE (Reactive Ion Etching) process. The ICP dry process is preferable because an etching rate thereof is high. Since the oxidized film 32 has an etching selectivity of 1:100 (SiO2:Si) with respect to silicon, it is suitable for a recess-forming mask film used in a dry etching process. Thus, the pair of inclined surfaces 24 (28*a*) and the recess 26 (40), which is defined by the pair of side surfaces 26*a* (40*a*) and the bottom surface 26*b* (40*b*), are formed.

Further, in this step, a pilot marker 38*b* having the same depth as that of the recess 40 is formed on the upper surface of the substrate 2. By measuring the depth of this pilot marker 38*b*, the depth of the recess 40 can be easily confirmed. This ensures that the recess 40 is formed without interfering with the optical fiber.

Figure 4I:
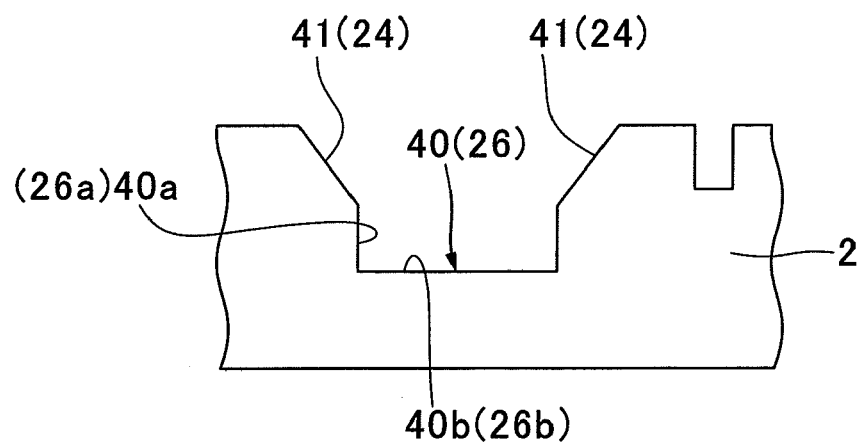
FIG. 4I is an illustrative view of a step of forming the groove for supporting the optical fiber.

Then, as shown in FIG. 4I, a step of removing the remaining oxidized film is preferably performed. This allows adhering matters to be removed, which adhering matters are removed from the substrate and then adhered to the oxidized film 32 in the dry etching process (see FIG. 4H). By performing this removing step, the substrate is exposed, and new inclined surfaces 41 are formed. In this case, the pair of inclined surfaces 24 are defined by the inclined surfaces 41, while the recess 26 between the inclined surfaces 24 is defined by the recess 40.

Figure 4J:
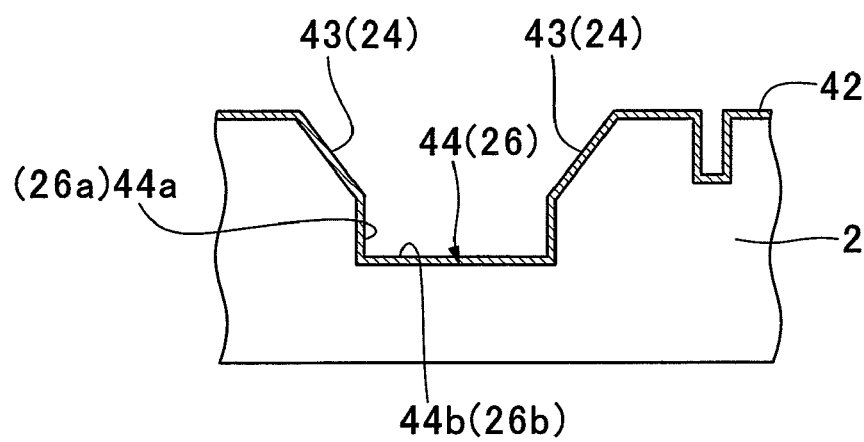
FIG. 4J is an illustrative view of a step of forming the groove for supporting the optical fiber.
Figure 5:
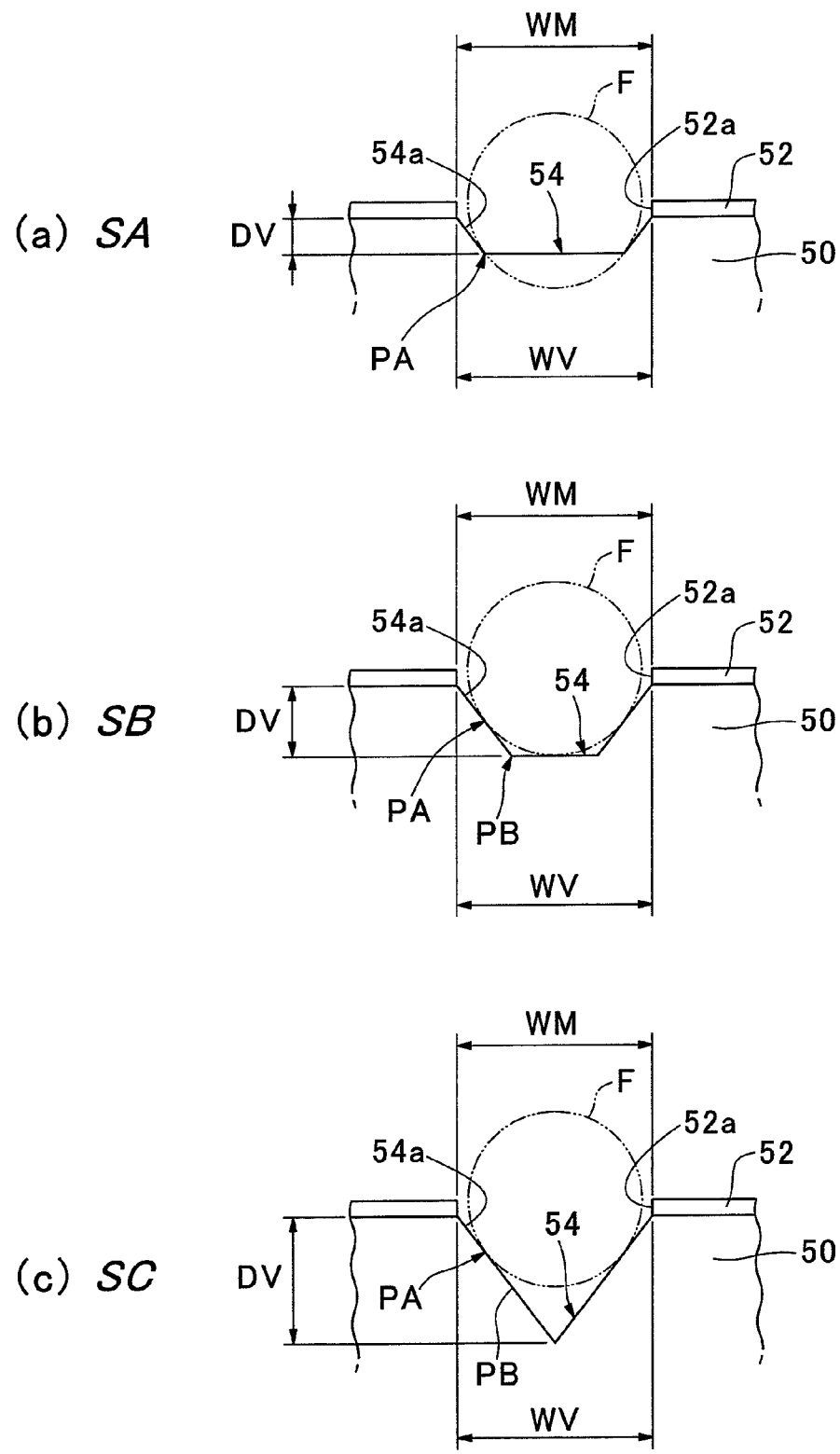
FIG. 5 is a cross-sectional view of a silicon substrate showing progressive etching when a groove having a V-shaped cross section or an inverted trapezoidal cross section is formed.
Figure 6:
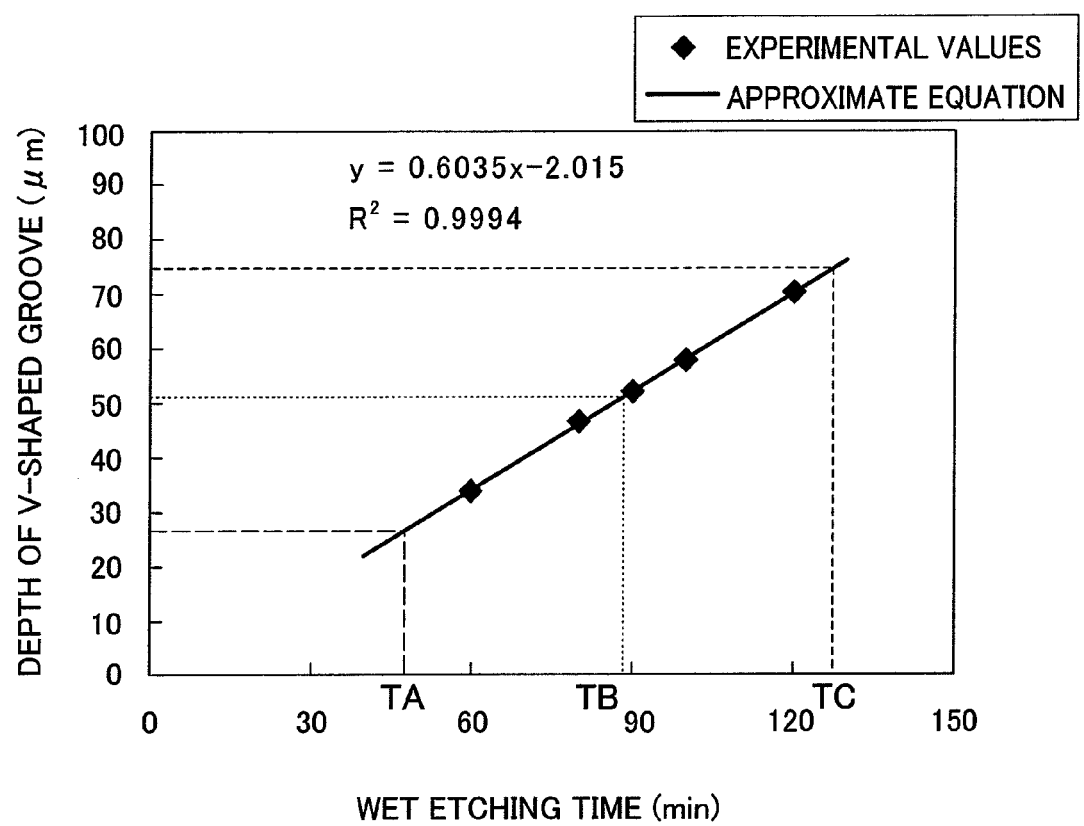
FIG. 6 is a graph showing the relationship between a wet-etching time and a depth of the groove.
Figure 7:
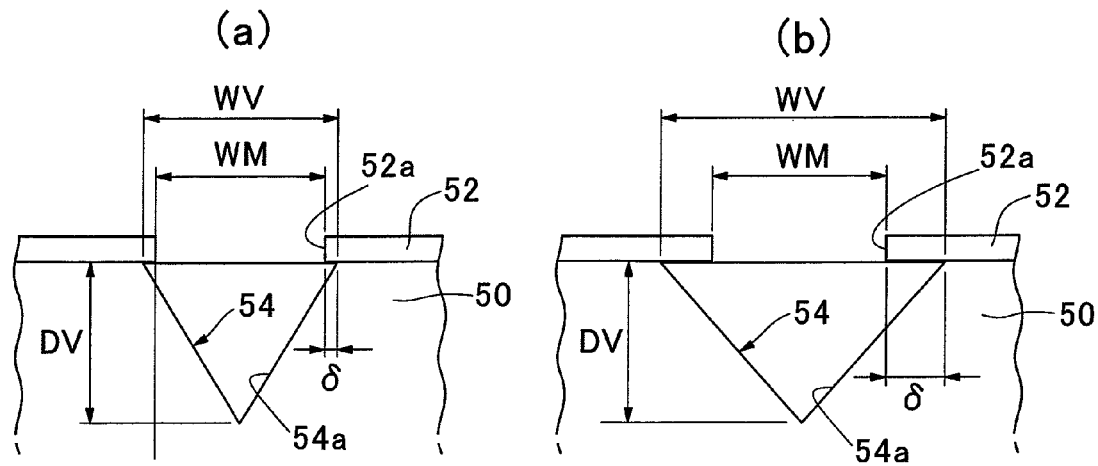
FIG. 7 is a view showing the relationship between widths of an aperture and the groove when there is an orientation misalignment.

Then, as shown in FIG. 4J, a step of forming a new oxidized film 42 on the substrate 2 is preferably performed. This allows new inclined surfaces 43 and a recess 44, which is defined by a pair of side surfaces 44*a* and a bottom surface 44*b*, to be formed and thus the inclined surfaces 41 and the recess 40 can be protected. In this case, the pair of inclined surfaces 24 are defined by inclined surfaces 43, and the recess 26 is defined by a recess 44 between the inclined surfaces 24.

Although the embodiments of the present inventions have been explained, the present invention is not limited to the aforementioned embodiments, various modifications of the embodiments being possible within the scope of the present invention recited in the claims, and thus it is apparent that the modified embodiments are also within the scope of the present invention.

In the aforementioned embodiments, an optical multiplexer/demultiplexer having an optical fiber intended to be disposed obliquely relative to the predetermined crystal orientation has been explained. However, it is apparent that the present invention is also applicable to a case in which an optical fiber to be aligned with the predefined crystal orientation is disposed slightly obliquely relative thereto.

Further, in the aforementioned embodiments, although the optical multiplexer/demultiplexer has been explained as an example of an optical device, other optical devices would fall within the scope of the present inventions, if they have inclined surfaces for supporting the optical fiber.

What is claimed is:

1. A method of manufacturing an optical device to be connected to an optical fiber, comprising a step of
forming a groove for supporting an optical fiber, wherein said step of forming a groove includes:
a first step of forming a pair of opposing inclined surfaces on a substrate having a crystal axis by using an anisotropic etching process; and
a second step of forming a recess by using a dry etching process, the recess being located between said pair of opposing inclined surfaces which are formed in the first step.

2. The method according to claim 1, wherein said first step is finished before a state in which the optical fiber can be supported on said pair of opposing inclined surfaces is achieved.

3. The method according to claim 2, wherein said second step is performed at least until a state in which the optical fiber can be supported on said pair of opposing inclined surfaces is achieved.

4. The method according to claim 1,
wherein said step of forming a groove further includes a third step of forming a recess-forming mask film between said first step and said second step, and
wherein said third step includes steps of:
forming an oxidized film on the substrate having the opposing inclined surfaces formed in said first step, and
removing a portion of the oxidized film by using a negative resist, said recess to be formed where the portion of the oxidized film is removed.

5. The method of-according to claim 1,
wherein said step of forming a groove further includes a third step of forming a recess-forming mask film between said first step and said second step, and
wherein said third step includes steps of:
forming an oxidized film on the substrate having the opposing inclined surfaces formed in said first step;
applying a negative resist onto said oxidized film;
removing a portion of the negative resist corresponding to said recess via a negative-resist mask;
removing a portion of said oxidized film corresponding to said recess by using the remaining portion of said negative resist as a mask; and
removing said negative resist so that the remaining portion of said oxidized film becomes said recess-forming mask film.

6. The method according to claim 5,
wherein said step of forming a groove further includes a step of removing the remaining portion of said oxidized film after said second step.

7. The method according to claim 6,
wherein said step of forming a groove further includes a step of forming a new oxidized film after said step of removing the remaining portion of said oxidized film.

8. The method according to claim 5,
wherein in the step of removing the portion of the negative resist corresponding to said recess, further removing a portion of the negative resist corresponding to a pilot marker via said negative-resist mask.

9. The method according to claim 1, wherein said recess is formed between and below said pair of opposing inclined surfaces.

10. The method according to claim 4, wherein the substrate is comprised of silicon, and the oxidized film has an etching selectivity of 1:100 with respect to silicon in said second step.

11. The method according to claim 5, wherein the substrate is comprised of silicon, and the oxidized film has an etching selectivity of 1:100 with respect to silicon in said second step.

* * * * *